(12) United States Patent
Klingler

(10) Patent No.: US 6,546,766 B1
(45) Date of Patent: Apr. 15, 2003

(54) LOCK NUT

(76) Inventor: Gregory L. Klingler, 824 E. Iowa Ave., Denver, CO (US) 80210

( * ) Notice: Subject to any disclaimer, the term of this patent is extended or adjusted under 35 U.S.C. 154(b) by 21 days.

(21) Appl. No.: 09/862,292

(22) Filed: May 22, 2001

Related U.S. Application Data

(60) Provisional application No. 60/213,897, filed on Jun. 26, 2000.

(51) Int. Cl.⁷ .............................................. F16B 41/00
(52) U.S. Cl. ........................ 70/230; 70/14; 70/229; 70/231; 70/232; 70/416; 411/294; 411/300
(58) Field of Search ........................... 70/14, 229, 230, 70/231, 232, 416; 411/513, 514, 515, 294, 300

(56) References Cited

U.S. PATENT DOCUMENTS

| | | | | |
|---|---|---|---|---|
| 750,211 A | * | 1/1904 | Miner | 411/294 |
| 1,625,901 A | | 4/1927 | Lay | |
| 1,937,848 A | | 12/1933 | Shinn | 70/90 |
| 2,225,132 A | | 12/1940 | Seaman | 70/259 |
| 3,540,245 A | | 11/1970 | Pope | 70/231 |
| 3,978,698 A | | 9/1976 | Ono | 70/165 |
| 4,003,227 A | * | 1/1977 | Casey | 292/258 |
| 4,336,698 A | | 6/1982 | Hurd | 70/231 |
| 4,621,873 A | * | 11/1986 | Weinstein et al. | 301/124.1 |
| 5,097,686 A | * | 3/1992 | Plumer | 70/232 |
| 5,325,685 A | * | 7/1994 | Frank | 292/292 |
| 5,649,437 A | * | 7/1997 | Royka et al. | 137/382 |
| 5,960,653 A | * | 10/1999 | DeWalch et al. | 70/164 |

* cited by examiner

*Primary Examiner*—Suzanne Dino Barrett
*Assistant Examiner*—Christopher J. Boswell

(57) ABSTRACT

A lock nut designed for securing a nut on bolt, specifically for those situations in which the bolt cannot be rotated and the bolt is located proximate to an object that can obstruct the ability to rotate the lock nut on the bolt. The lock nut can change form by the addition of pieces, the removal of pieces, or by changing the shape of a single piece. The lock nut is designed such that in one form it can be threaded onto the bolt and, thereafter, it can be changed in form and locked into this new form, the new form being such that the lock nut cannot be fully rotated on the bolt without encountering an obstruction, thus preventing the ability to remove the lock nut.

3 Claims, 2 Drawing Sheets

Figure 4:
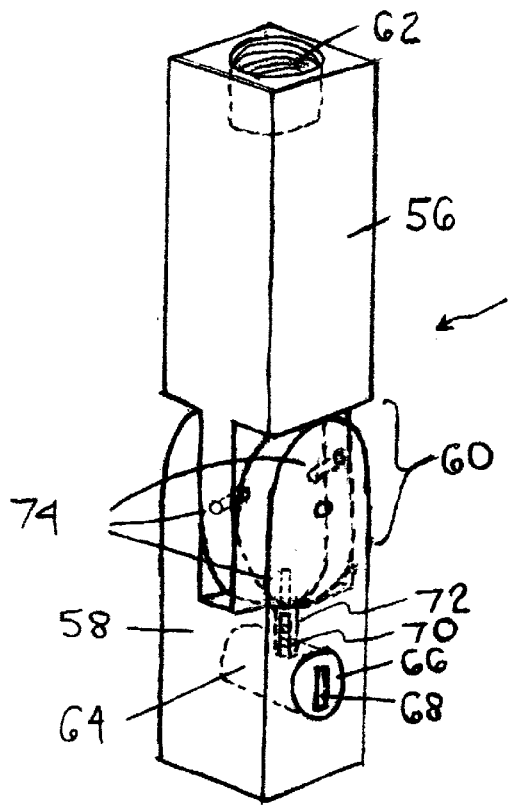
Figure 4:
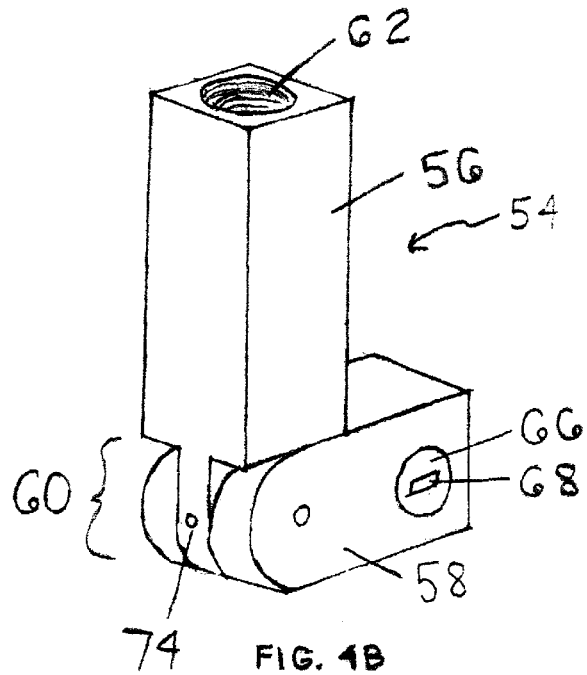

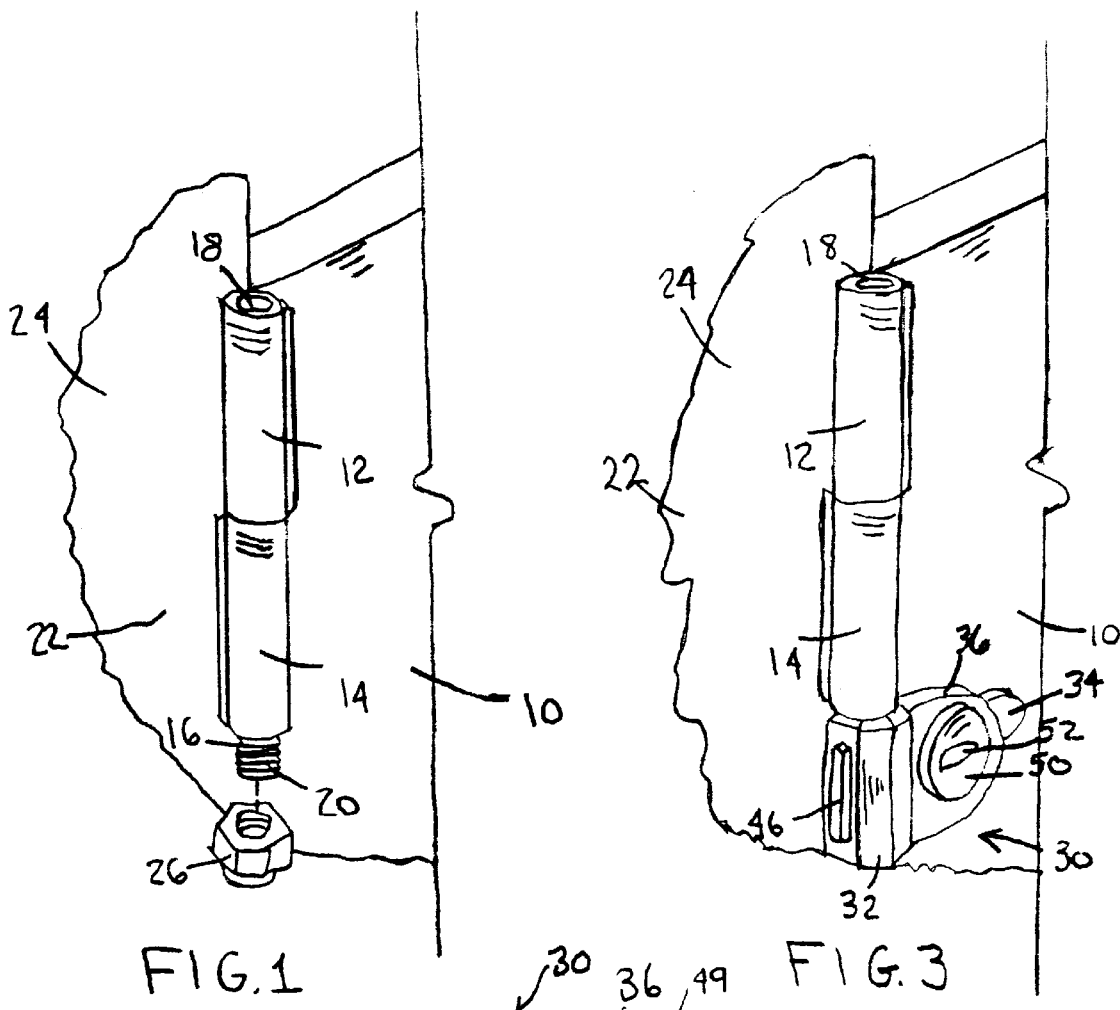
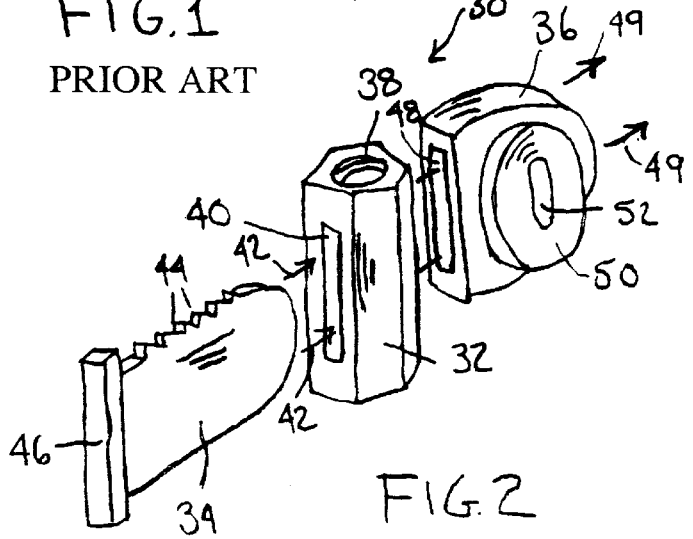
FIG. 1 PRIOR ART
FIG. 2
FIG. 3

LOCK NUT

CROSS REFERENCE TO RELATED APPLICATIONS

This application is entitled to the benefit of provisional patent application Ser. No. 60/213,897 filed Jun. 26, 2000.

STATEMENT REGARDING FEDERALLY SPONSORED RESEARCH AND DEVELOPMENT

Not applicable.

BACKGROUND

1. Field of Invention

This invention relates to a lock nut, specifically to a nut that can be locked onto a bolt such that it cannot be removed without a key or other means to unlock it.

2. Description of Prior Art

There are many circumstances in which it is desirable to lock a nut in place once it has been positioned on a lug, or bolt, such that the nut cannot be removed without a key or other means to unlock it. Most commonly such nuts have been developed to lock wheels on cars so that the wheels cannot be stolen. Lock nuts to prevent wheel theft have typically been of three types:

One type relies on a cylindrical nut body of hardened metal with a recessed channel of irregular shape at the end opposite that of a threaded cavity. This type makes use of a special wrench as the means to unlock the nut. The special wrench is designed to fit in the irregularly shaped channel in order to grip and turn the nut. Since the outside of the nut is round in shape and hardened, common tools cannot grip it. The cylindrical shape of the nut provides no flat surface for a standard wrench to engage, and the teeth of pliers or the like typically cannot get a bite on the rounded hardened surface.

Another type is constructed to have a removable cap such that when the cap is placed and locked onto the nut, the cap rotates and prevents the removal of the nut. The cap must be removed in order to grip and turn the nut.

Still another type provides an integral rotatable cap or sleeve on the nut that includes a locking means for locking the cap or sleeve directly to the nut so that rotation of the cap rotates the nut for removal thereof. More recent designs of this type have included improvements to prevent the device from being rendered ineffective if a hammer or the like were to be used in an attempt to jam or break the locking mechanism. Other design improvements have included magnetically actuated locking mechanisms. Magnetic lock actuation eliminates the key hole that is present in a standard mechanically actuated lock. The lack of a key hole prevents the ability to pick the lock with hair pins or the like.

Exemplary of the prior art for lock nuts to secure wheels are the following U.S. Pat. Nos. 1,625,901 issued Apr. 26, 1927 to Lay, 1,937,848, issued Dec. 5, 1933 to Shinn, 2,225,132 issued Dec. 17, 1940 to Seaman, 3,540,245 issued Nov. 17, 1970 to Pope, 3,978,698 issued Sep. 7, 1976 to Ono, and 4,336,698 issued Jun. 29, 1982 to Hurd.

Another application for the use of a lock nut can be found in many heavy industry manufacturing facilities. Such nuts are often used to limit access to portions of a manufacturing process that are considered unsafe when the process is running. Examples include man-holes providing access to vessels that operate under high pressure and/or temperature, as well as cover plates providing access to machinery operating under very high speeds, such as turbines in a power plant. In order to prevent the removal of these man-holes or cover plates when conditions are not safe, it is common practice to drill a hole through the end of the bolt. Once a nut is threaded over the bolt, beyond this hole, a padlock is inserted through the hole in the bolt, thereby locking the nut in place on the bolt.

Over the years, as lock nut design changes have been made in order to better thwart any unauthorized effort to remove the nut, these changes have typically come at the expense of greater complexity of the design and hence, higher cost to manufacture. The earlier designs, comprising a single cylindrical piece with a special shaped channel, were relatively inexpensive to make but ultimately could be gripped and rotated under sufficient force by a device such as a vice grip. Later designs, with rotating caps, were less easily removed but more complex and, consequently, more expensive to manufacture. These devices could be rendered ineffective by crushing the cap against the nut such that the nut would turn when the cap turned. Still later designs, such as U.S. Pat. No. 4,336,698, while making it more difficult to crush the cap against the nut, did so at the expense of further complexity and cost to manufacture. Other simpler yet effective means to lock a nut in place, such as the method applied in many manufacturing facilities, require that a modification be made to the bolt or lug to which the nut would be attached.

SUMMARY

The essence of the present invention is a lock nut that, in one configuration can be threaded onto a bolt and, after threading, can be transformed into a different configuration that can be locked into place, the transformed configuration being of such size and shape that the nut cannot be removed without encountering an obstruction. The application of this invention is specific to situations in which the receiving bolt is fixed in place relative to an "obstruction" object, and the receiving bolt cannot be rotated.

OBJECTS AND ADVANTAGES

The prior art examples are advantageous in that, in each case, the means for locking the nut is entirely within the lock nut device itself. Said another way, if the nut can be threaded onto a bolt, it can be locked onto the bolt. The present invention cannot make such a claim. The present invention relies on the geometry surrounding the bolt in the specific application for which the lock nut is desired. It makes use of that geometry, specifically it relies on some object within that geometry to provide an obstruction that prevents the nut from being removed. Though its application is more limited than those of the prior art, the present invention has several advantages over the prior art.

Accordingly, the objects and advantages of the present invention are:

(a) to provide a lock nut that is simple in design and, therefore, easy and inexpensive to manufacture;

(b) to provide a lock nut that is rugged in structure and can be quickly mounted on the receiving bolt.

(c) to provide a lock nut that does not require any special tools to install or remove;

(d) to provide a lock nut that can be gripped with any of an assortment of standard tools but cannot be removed without unlocking it;

(e) to provide a lock nut that is not rendered ineffective by attempts to jam or break the lock mechanism such as by the use of a hammer or the like;

(f) to provide a lock nut that is designed with an understanding of the specific geometry of the intended use, and which relies on that geometry to provide an obstruction that interferes with the ability to remove the lock nut when in the locked position;

(g) to provide a lock nut that does not require the modification of the corresponding bolt in order to function;

(h) to provide a lock nut that can be threaded onto the receiving bolt in one configuration and, thereafter, can be locked in place in an alternate configuration.

A preferred embodiment of the lock nut was developed for the specific application of locking a nut on the hinge bolt of a Jeep Wrangler door. As it happens, just as is the case with many automobile wheels, Jeep Wrangler doors are often stolen. In their normal factory configuration, the doors can be stolen by removing just one nut from the door upper hinge bolt. The doors are in high demand as replacement parts. As evidence of the utility of this embodiment, there exists a commercial locking product to prevent theft of the Jeep Wrangler door. The product, manufactured by Tuffy Corporation of Cortez, Colo., was not listed herein as an example of prior art, because it does not rely on a locking nut mechanism. The Tuffy design relies on a cam which rotates over the hinge bolt, preventing the ability to lift the door off of the hinge.

The geometry of the Wrangler door hinge satisfies the two constraints of this invention in that the hinge bolt cannot be rotated and the geometry surrounding the bolt provides an obstruction that prevents the removal of the nut when in the locked configuration. In the case of this embodiment of the invention, the vehicle body itself acts as the obstruction. This embodiment includes a slotted nut that can be threaded onto the hinge bolt threads in place of the standard nut that comes with the Wrangler. Once the slotted nut has been threaded, a lock cylinder is locked in place on the slotted nut. The joined configuration of the slotted nut, locked together with the lock cylinder, is of such size that the lock nut interferes with the vehicle body if one tries to rotate the nut. The interference prevents the nut from being turned by more than 180 degrees, thereby preventing removal of the lock nut and securing the door against theft.

The preferred embodiment of the lock nut includes a slotted nut for threading on the end of the hinge bolt. The slotted nut includes a pin slot therethrough. A pin is dimensioned for receipt through the pin slot. The pin includes a plurality of sawtooth teeth and a pin stop. A lock cylinder pin slot, in a lock cylinder, receives a portion of the pin therethrough. The lock cylinder also includes a lock face with a key slot. When a lock key is inserted into the key slot and turned, internal workings of the lock cylinder engage the pin for securing the lock cylinder next to a side of the slotted nut.

An alternate embodiment is presented to illustrate the fact that this invention need not be comprised of multiple pieces. The aforementioned preferred embodiment used three separate pieces—a pin, a slotted nut, and a lock cylinder. The alternate embodiment uses a single piece which is hinged and can be locked either in a straight line or "L" shaped configuration. This invention requires that a lock nut be threaded onto a bolt in one configuration and, thereafter, be locked in place in a different configuration. The configuration change can be the result of adding pieces or of changing the shape of a single piece. This alternate embodiment could be used in the same application as the preferred embodiment. It could also be used to lock the wheels on many 4 wheel drive vehicles. Since on most 4 wheel drive vehicles the axle end extends beyond the plane formed by the base of the wheel lugs, this lock nut could be threaded on a wheel lug in the straight line configuration, then locked in the "L" shaped configuration. Once locked, the nut would be blocked by the axle if one were to attempt to rotate and remove it.

These and other objects of the present invention will become apparent to those familiar with the different types of lock nuts when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

DRAWING FIGURES

The accompanying drawings illustrate complete preferred embodiments of the present invention according to the best modes presently devised for the practical application of the principles thereof, and in which:

FIG. 1 is a perspective view of a portion of a vehicle door and upper and lower door hinge pieces attached together using a hinge bolt. The upper hinge piece is attached to the vehicle door and the hinge bolt is permanently affixed within this upper hinge piece. The lower hinge piece is attached to a side portion of the vehicle body. The lower hinge piece is secured on the hinge bolt using a threaded nut.

FIG. 2 is a perspective view of the subject vehicle lock nut. The lock nut includes a pin, a slotted nut, and a lock cylinder.

FIG. 3 is a perspective view of the subject vehicle hinge lock nut secured to the door hinge bolt shown in FIG. 1. The slotted nut is threaded on the lower threaded end of the hinge bolt. The pin is received through a pin slot in the slotted nut and through a lock cylinder pin slot in the lock cylinder.

FIG. 4 shows, in perspective view, two configurations of an alternate embodiment showing a rod, with square cross section, that is hinged in the middle. The rod contains a threaded cylindrical cavity on one end and a locking mechanism toward the opposite end. The locking mechanism can lock the rod in either a straight-line configuration or "L" shaped configuration, the two configurations being realized by movement of the end portions relative to the hinge.

Figure 5:
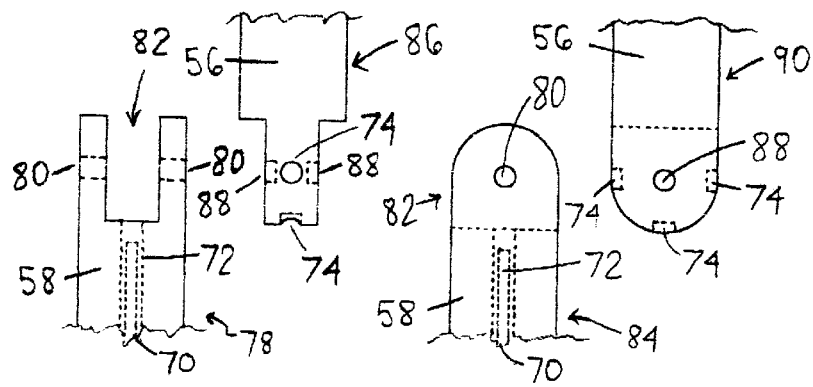

FIG. 5 presents detail views of the hinge portion of the alternate embodiment lock nut.

REFERENCE NUMERALS IN DRAWINGS

10 Vehicle Door
12 Upper Hinge Piece
14 Lower Hinge Piece
16 Hinge Bolt
18 Upper End Of Hinge Bolt
20 Lower Threaded End Of Hinge Bolt
22 Side Portion Of Vehicle Body
24 Vehicle Body
26 Threaded Nut
30 Lock Nut, Preferred Embodiment
32 Slotted Nut
34 Pin
36 Lock Cylinder
38 Threaded End Of Slotted Nut
40 Slotted Nut Pin Slot
42 Arrows Indicating Pin Insertion
44 Pin Sawtooth Teeth
46 Pin Stop 48 Lock Cylinder Pin Slot
49 Arrows Indicating Pin Insertion
50 Lock Face
52 Key Slot
54 Lock Nut, Alternate Embodiment
56 Upper Segment
58 Lower Segment
60 Hinge
62 Threaded Cylindrical Cavity
64 Locking Mechanism
66 Lock Face
68 Key Slot
70 Cylindrical Cam
72 Lower Segment Cam Channel
74 Upper Segment Cam Cavity
76 Lower End Of Upper Segment
78 Hinge Front View—Upper Part Of Lower Segment
80 Hinge Pin Cavities—Lower Segment
82 Hinge—Lower Segment Recessed Region
84 Hinge Side View—Upper Part Of Lower Segment
86 Hinge Front View—Lower Part Of Upper Segment
88 Inner Hinge Pin Cavities

DESCRIPTION—MAIN EMBODIMENT

In FIG. 1, a perspective view of a portion of a vehicle door 10 is shown along with an upper hinge piece 12 and a lower hinge piece 14. The two hinge pieces 12 and 14 are attached together using a hinge bolt 16. An upper end 18 and a threaded lower end 20 of the hinge bolt 16 can be seen in FIGS. 1 and 3. The upper hinge piece 12 is attached to a portion of the vehicle door 10. The lower hinge piece 14 is attached to a side portion 22 of a vehicle body 24. The hinge bolt 16 is permanently affixed within the upper hinge piece 12. The lower hinge piece 14 is secured on the hinge bolt 16 using a threaded nut 26.

In FIG. 2, a perspective view of a subject lock nut is shown and having general reference numeral 30. The lock nut includes a slotted nut 32, a pin 34, and a lock cylinder 36.

The slotted nut 32 includes a threaded upper end portion 38 adapted for threading onto the threaded lower end 20 of the hinge bolt 16. The slotted nut 32 also includes a slotted nut pin slot 40 therethrough.

The pin 34 is dimensioned for receipt through the pin slot 40 as indicated by arrows 42. The pin 34 includes a plurality of sawtooth teeth 44 and a pin stop 46 at one end of the pin 34. While the pin 34 is shown with the sawtooth teeth 44, it can be appreciated that various types of pins, used as locking devices, can be used equally well without departing from the spirit and scope of the subject invention.

The lock cyclinder 36 includes a lock cylinder pin slot 48 for receiving a portion of the pin 34 therethrough as indicated by arrows 49. The lock cylinder 36 also includes a lock face 50 with a key slot 52. In operation, when a lock key is inserted into the key slot 52 and turned, internal workings of the lock cylinder engage the sawtooth teeth 44 of the pin 34 for securing the lock cylinder 36 next to a side of the slotted nut 32. The lock key is not shown in the drawings. The lock cylinder 36 and the pin 34 are similar to locking devices, often called showcase locks, used in securing sliding doors in window display units used in jewelry stores, coin stores and similar stores displaying expensive merchandise. The pin stop 46 prevents the pin 34 from passing completely through the slotted nut 32 and allows the lock cylinder 36 to be locked tightly against the slotted nut 32.

In FIG. 3, a perspective view of the subject lock nut 30 is shown and secured to the door hinge bolt 16. In this drawing, the slotted nut 32 is threaded on the lower end 20 of the hinge bolt 16. The pin 34 is shown received through the pin slot 40 in the slotted nut 32 and through the lock cylinder pin slot 48 in the lock cylinder 36. It should be noted that, if someone should try to remove the lock nut 30 from the hinge bolt 16, the lock nut 30 can rotate no more than 180 degrees before the lock cylinder 36 engages the side portion of the vehicle body 22, thereby preventing further movement of the lock nut 30, thus preventing removal of the lock nut 30. This embodiment illustrates the two chief constraints of the present invention which include a fixed bolt (hinge bolt 16) that cannot be rotated and geometry surrounding the hinge bolt that provides an obstruction. In this case the side portion of the vehicle body 22 serves as the obstruction.

OPERATION—MAIN EMBODIMENT

In order to affix the lock nut 30 onto the hinge bolt 16, the slotted nut 32 is threaded onto the lower threaded end of the hinge bolt 20. Thereafter, the pin 34 is inserted completely through the slot 40 of the slotted nut 32 until the two pin stops 46 rest against the slotted nut 32. The portion of the pin 34 protruding beyond the slotted nut 32 is received into the lock cylinder pin slot 46. The key is then inserted into the key slot 52, and turned, locking the lock cylinder 36 to pin 34 by engaging the pin sawtooth teeth 44. With the lock cylinder 36 held tightly against the slotted nut 32 via the pin 34, the slotted nut cannot be rotated more than 180 degrees due to the lock cylinder encountering the vehicle body. Since the lock nut 30 cannot be rotated sufficiently, when locked, it cannot be removed from the hinge bolt 16.

DESCRIPTION AND OPERTION—ALTERNATE EMBODIMENT

In FIG. 4, a perspective view of two configurations of an alternate embodiment lock nut 54 is shown comprised of a rod with upper 56 and lower 58 segments of square cross section that are joined by a hinge 60. One configuration shows the rod in a straight line, FIG. 4A, and the other shows the rod in an "L" shape, FIG. 4B. The upper segment 56 contains a threaded cylindrical cavity 62 that can be threaded on a receiving bolt (not shown). The lower segment 58 contains a locking mechanism 64 comprised of a lock face 66, a key slot 68, and having a cylindrical cam 70 housed inside a lower segment cam channel 72. The internal workings of the locking mechanism 64 are such that, when a key is inserted into the key slot 68 and turned, the cylindrical cam 70 is pushed forward through the lower segment cam channel 72, extending beyond the end of the lower segment 58. This locking mechanism 64 is similar to common locks found on many windows and doors. Several upper segment cam cavities 74 are present within the lower end 76 of the upper segment 56. The upper segment cam cavities 74 are dimensioned for receipt therein of the end of the cylindrical cam 70.

In FIG. 5, detail views are shown illustrating the features of the hinge 60. A front view 78 of the upper part of the lower segment 58 is shown, illustrating the lower segment cam channel 72, the cylindrical cam 70, opposing hinge pin cavities 80, and a recessed region 82 into which the upper segment 56 is fit. A side view 84 of the upper part of the lower segment is also shown, illustrating the same features.

A front view 86 of the lower part of the upper segment 56 is shown, illustrating the opposing inner hinge pin cavities 88 and the upper segment cam cavities 74. A side view 90 of the lower part of the upper segment is also shown, illustrating the same features.

To assemble the hinge, the lower portion of the upper segment 56 is inserted into the lower segment recessed region 82 and secured with hinge pins (not shown). The hinge pins are press fit into the lower segment hinge pin cavities 80. The end of the hinge pins protrude beyond the lower segment hinge pin cavities 80 and into the inner hinge pin cavities 88 of the upper segment 56. The inner hinge pin cavities 88 are dimensioned such that the hinge pins can rotate freely within them, thus enabling the upper 56 and lower 58 segments to rotate with respect to the hinge 60 (FIG. 4).

In this particular embodiment, the lock nut may be locked into any of three different configurations by turning the key and extending the cylindrical cam beyond the lower segment and into one of the three cam cavitiess of the upper segment. It should be noted that this embodiment provides for two "L" shaped configurations (one left and one right) as well as a straight-line configuration. Other configurations could be realized by placing additional cam cavities along the lower perimeter of the upper segment.

CONCLUSION, RAMIFICATIONS, AND SCOPE

Thus the reader will see that the lock nut of the invention provides a rugged economical device that is easily installed, can be gripped with any assortment of standard tools, and is not easily rendered ineffective by attempts to jam or break the lock mechanism.

While the above description contains many specificities, these should not be construed as limitations on the scope of the invention, but rather as exemplification of embodiments thereof. Two embodiments have been presented illustrating how the configuration of the lock nut is changed after the nut has been threaded onto the bolt. In the preferred embodiment, a lock cylinder is locked against a slotted nut, thus adding to the form and dimension of the combined pieces of the lock nut. In the alternate embodiment, the configuration of a single piece is changed by the rotation of two segments, relative to each other, along a hinge. There are many other suitable means for changing the configuration of the device after the threaded nut portion has been threaded onto the bolt. For example:

(a) Multiple pieces of various shapes could be locked onto the nut portion.

(b) A hole could be incorporated through the lower portion of the nut and a lock, such as a padlock, could be inserted therethrough and locked.

(c) A hinged device, like the alternate embodiment, could be constructed such that the two segments could be locked at almost any angle relative to each other, depending on the placement of the upper segment cam cavities within the hinge. These examples are but a few of many means to change the configuration of the lock nut, once the nut has been threaded onto a bolt, such that the lock nut in its altered configuration would be blocked by an obstruction object if one were to attempt to rotate and remove it.

Likewise, each piece described within the aforementioned embodiments could be changed in form in ways that would not affect its function. As one example, the square cross section of the alternate embodiment could equally well be hexagonal, octagonal or any of many other polygonal shapes.

Accordingly, the scope of the invention should be determined not by the embodiments illustrated, but by the appended claims and their legal equivalents.

The embodiments of the invention for which an exclusive privilege and property right are claimed are defined as follows:

1. A lock nut for securing an item to a fixed bolt that is located proximate to an object which can obstruct the ability to rotate said lock nut on said fixed bolt once said lock nut has been locked; said lock nut being able to be threaded onto a non-fixed end of said fixed bolt then locked in place; said lock nut thereby being able to secure said item to said fixed bolt once said item has been positioned such that said non-fixed end of said fixed bolt has passed through an aperture in said item; said lock nut, when locked, being positioned entirely on a side of said item opposite from a side of said item which is nearest to a fixed end of said fixed bolt; said lock nut comprising:

(a) a threaded cavity for threading said lock nut onto said bolt;

(b) in combination, a means to change the size and/or shape of said lock nut and a locking/unlocking mechanism to secure said lock nut in any of multiple size/shape configurations, at least one of said configurations causing said lock nut to encounter said object which can obstruct the ability to rotate said lock nut, if one were to attempt to remove said lock nut from said bolt.

2. The lock nut of claim 1 wherein said lock nut is comprised of:

(a) a threaded slotted nut adapted for threading on a threaded end of said bolt, said slotted nut having a pin slot therethrough;

(b) a pin dimensioned for receipt through said pin slot, said pin having a pin stop and a plurality of sawtooth teeth;

(c) a lock cylinder with a lock cylinder pin slot, said lock cylinder pin slot receiving a portion of said pin therethrough, said lock cylinder also having a locking means whereby when said lock nut is locked via said locking means internal workings in said lock cylinder engage said sawtooth teeth of said pin for securing said lock cylinder next to a side of said slotted nut, the additional size of said lock cylinder causing said lock nut to encounter said object which can obstruct the ability to rotate said lock nut, if one were to attempt to remove said lock nut from said bolt.

3. The lock nut of claim 1 wherein said lock nut is a single piece containing in combination, a hinge allowing two segments of said lock nut to rotate relative to one another and a locking means to lock said two segments in certain fixed positions relative to said hinge, whereby certain relative positions of said two segments allow said threaded cavity of said lock nut to be threaded onto said bolt, and other relative positions of said two segments cause said lock nut to encounter said object which can obstruct the ability to rotate said lock nut, if one were to attempt to remove said lock nut from said bolt.

* * * * *